United States Patent [19]

Nilsson

[11] 4,018,093
[45] Apr. 19, 1977

[54] DEVICE FOR TRANSFORMING RECIPROCATING MOTIONS INTO TURNING MOTIONS

[75] Inventor: Sven Walter Nilsson, Partille, Sweden

[73] Assignee: SKF Nova A.B., Goteborg, Sweden

[22] Filed: Sept. 30, 1975

[21] Appl. No.: 618,146

[30] Foreign Application Priority Data

Nov. 4, 1974 Sweden .................. 7413796

[52] U.S. Cl. .................................. 74/126
[51] Int. Cl.² ................................ F16H 27/02
[58] Field of Search ............ 74/126, 128; 335/120, 335/126

[56] References Cited

UNITED STATES PATENTS

| | | | |
|---|---|---|---|
| 2,763,793 | 9/1956 | Krasney | 74/126 |
| 3,124,009 | 3/1964 | Grover | 74/126 |
| 3,156,125 | 11/1964 | Straub | 74/126 |
| 3,204,475 | 9/1965 | Pierce | 74/128 |
| 3,308,410 | 3/1967 | Biser | 74/126 |
| 3,320,822 | 5/1967 | Tatom | 74/126 |

Primary Examiner—Samuel Scott
Assistant Examiner—Wesley S. Ratliff, Jr.
Attorney, Agent, or Firm—Eugene E. Renz, Jr.

[57] ABSTRACT

A device for transforming a reciprocating linear movement into a rotary movement comprising a first member adapted for reciprocating axial movement relative to a turnable second member, means for displacing said reciprocating first member in opposite linear directions, at least a pair of annular sleeves disposed in a space between said first and second members, each sleeve having a frustoconical tapered surface confronting and adapted for torque transmitting engagement with a corresponding tapered surface on one of said members, the surface of each sleeve opposite the frustoconical surface confronting a surface of the other one of said members and guide means including at least one helical groove in one of said confronting surfaces and a guide element engageable in said grooves, actuation of said one member linearly in one axial direction causing engagement with the frustoconical surface of one sleeve to prevent turning relative to said one member and through said guide means rotation of said other member, actuation of said one member linearly in an opposite axial direction causing engagement with the frustoconical surface of said other sleeve and through said guide means rotation of said other member.

11 Claims, 3 Drawing Figures

DEVICE FOR TRANSFORMING RECIPROCATING MOTIONS INTO TURNING MOTIONS

The present invention relates to a device for transforming reciprocating motions into turning motions. The device is suitable for use in indexing or feeding systems, in which consecutive turning motions of a shaft or the like is desired. Depending on the actual design of the device, either turning in the same direction or alternating turning motions can be achieved.

Devices for achieving stepwise feeding of a shaft are previously known. Such devices usually consist of a combination of a gear and an intermittently working motor.

Such arrangements are, however, comparatively complicated and expensive, and therefore, it has been proposed to use devices for transforming reciprocating linear motion into turning motion, since producing reciprocating motion is comparatively easy. Such a device is described in, for example, the German patent publication No. 1,175,351. The device comprises a plate which is axially movable by means of an electromagnet. The plate is pressed against a number of rolling bodies which roll in a number of grooves arranged at an angle with respect to the plate in a supporting facing said plate. By the rotation of the rolling bodies the plate is thereby turned at the same time as it is moved axially. When the magentic field ceases to work, a cage returns the rolling bodies and thereby also presses the plate back to its starting point. For the purpose of turning the cage, a spring is provided between the cage and a fixed support in the device. The turning of the plate is transferred to a shaft via a number of axially directed pins arranged in the plate. The pins co-operate with corresponding axial grooves in a ring which is fixed to the shaft. By alternating connection and disconnection of the magnet, the shaft is stepwise turned in the same direction, an angle which is determined by the rolling of the rolling bodies in said angular grooves. In order to achieve the possibility of rotation in both directions, two oppositely arranged turning means of said kind are required.

The above described device comprises comparatively complicated means for transforming the linear motion into rotational motion. For example, it is necessary to use a springloaded cage for the rolling body, which can be harmful to the reliability of the device. Furthermore, the torque-transmitting pins have a considerable distance between their shearing planes near one of the end positions, which means a great risk of deforming the pins and thereby causing operational disturbances.

With a device according to the present invention, the characterizing features of which appear in the appended claims, the transformation from linear motion into rotational motion is carried out by simple means and with a high degree of reliability and a high precision. With only small modifications the device can be used either for consecutive turning in the same direction or for alternatingly turning a shaft. The device is especially suitable for use in such applications in which the linear motion is achieved by magnetic forces.

Some preferably embodiments of the invention will be described below in connection to the accompanying drawings in which.

Figure 1:
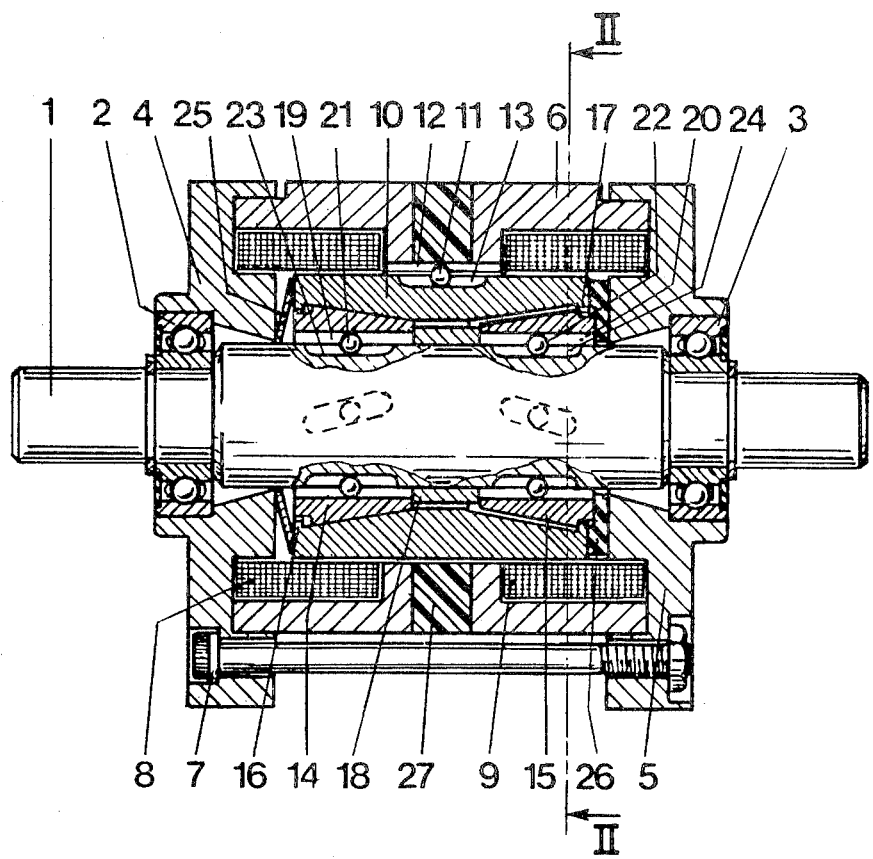
FIG. 1 shows a longitudinal section according to Section I-I in FIG. 2.
Figure 2:
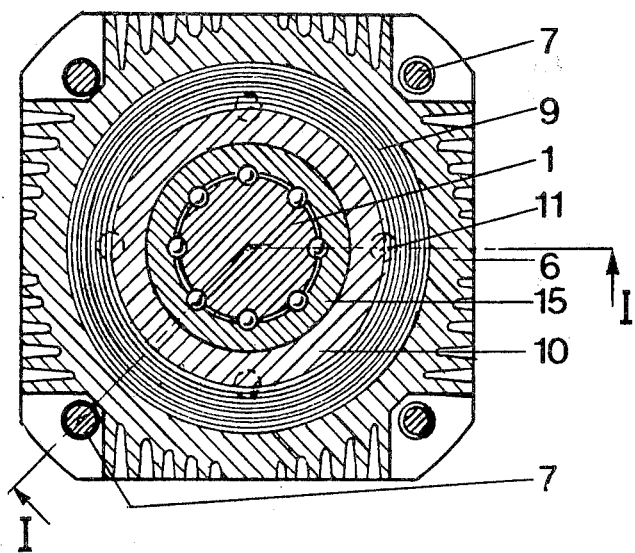
FIG. 2 shows a cross section according to Section II-II in FIG. 1.

In the embodiment according to FIGS. 1 and 2, a shaft 1 is mounted in two ball bearings 2, 3, which are mounted in end shields 4 and 5 respectively. The end shields, which are suitably made of a material with a high magnetic permeability, are separated by an intermediate cover 6, also suitably made of a material with a high magnetic permeability, and are connected to this cover by a number of bolts 7. At each end of the cover 6 magnetic solenoids 8, 9 are provided. These magnetic solenoids can alternatingly be connected to a source of current in a way known per se. The magnetic solenoids are surrounding the ends of an axially movable device 10 in the shape of a cylindrical core, suitably made of magnetic iron, which device is secured against free rotation in the cover by a number of rolling bodies 11 arranged around the circumference and fitting into grooves 12, 13 in the cover and the core respectively. The grooves 12, 13 suitably have an axial extension, but also a helical extension is possible. The shaft 1 passes through a central axial bore in the core 10. At each end of this bore a tapered portion is provided, and between these portions and the shaft two sleeves 14, 15, respectively are provided. The tapered portions of the sleeves are adapted to the tapered portions of the core, and the cone angle is suitably somewhat greater than twice the frictional angle between the sleeves and the core. The sleeves are prevented from falling out of the core by the fact that the core is provided with radially inwardly directed flanges 16, 17 at its ends. Furthermore, the sleeves are prevented from cooperating with the core simultaneously by a distance sleeve 18, for example, in the shape of a spring.

The bores, 14, 15 of the sleeves are provided with a number of grooves 19, 20 in which a number of radially inwardly projecting devices in the shape of balls 21, 22 are provided. These balls are also projecting into grooves 23, 24 in the shaft. The grooves 23, 24 and/or the grooves 19, 20 have a generally helical shape. The pitch of the helix can vary along the axial extension, so that it approximately corresponds to the magnetic force on the core during its motion.

The device described above operates as follows:

When one of the magentic solenoids 8 is energized, a magnetic field is created which tends to close the air gaps existing in the field. Therewith the narrowest gap is closed first. In this case this is the tapered gap between the core 10 and the sleeve 14. Said pieces are thereby connected by friction and magnetism. Thereafter, the core continues its axial motion, whereby the shaft 1 is forced to turn by the helical grooves which in this figure are constituted by the grooves 23, 24 and the balls 21, 22. During this motion, the sleeve 15 is disconnected from the core 10 and can rotate freely in relation to it. When the core 10 has reached its end position, the other magnetic solenoid is energized, and the process is repeated in the opposite direction. If it is desired that the rotation of the shaft 1 be in one and the same direction, the pitch direction of the helical grooves 24 must be opposite to the grooves 23, and if an alternating turning of the shaft 1 is desired, the grooves 23 and 24 have the same pitch direction.

It is preferable that the axial motion of the core 10 is smoothly retarded at the turning points. To this end a spring in the shape of, for example, a disk spring 25 or a shock-absorbing device 26 of a highly elastic compressible material, for example, foam rubber or foam plastics can be used. For the sake of simplicity, those types are shown in the same figure, but it is, of course, suitable to use the same kind of springs at both ends in each device. In order to improve the magnetic properties of the device, the disk spring is suitably made of a ferro-magnetic material, and the plastic foam spring can be filled with iron powder or other particles of ferro-magnetic material. A further advantage of pre-stressing the core between springs is that the resulting axis force on the core becomes more even along the whole distance of movement, because the magnetic force increases, when the air gap between the end shield and the core decreases, whereas the spring force counteracts the magnetic force.

In order to guide the magnetic field around the respective solenoid and prevent it from being closed around both solenoids simultaneously, the cover 6 may suitably be divided in a plane between the solenoids preferably perpendicularly to the solenoid axis by a portion 27 of a material with a low magnetic permeability.

Figure 3:
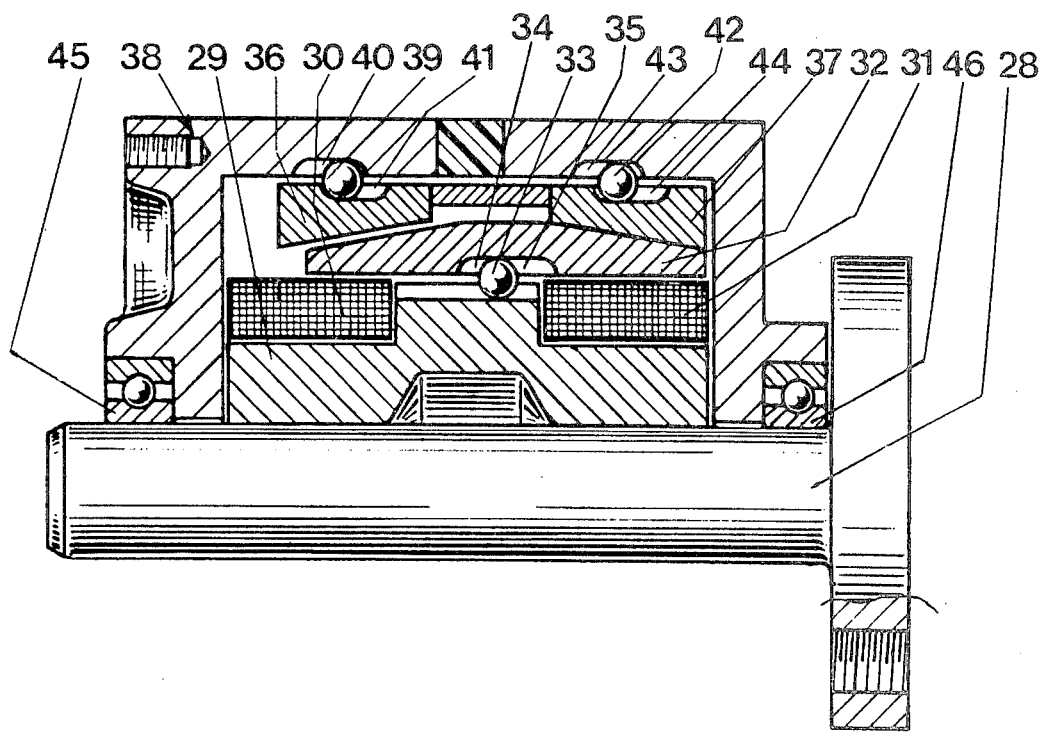
FIG. 3 shows a longitudinal section of an alternative embodiment of the device according to the invention.

In FIG. 3 a longitudinal section of an alternative embodiment of the invention is shown. The device comprises a stationary shaft 28 on which a stator core 29 is fixed. On this core 29 two electro-magnets 30 and 31 are provided analogously with what is shown in FIG. 1. A double-conical body 32 corresponding to the body 10 in FIG. 1 surrounds the magnets 30, 31 and is axially movable in relation to these, while it is prevented from being turned by a linear guidance 33, 34, 35 corresponding to the device 11, 12, 13 in FIG. 1. Around the tapered portion of the body 32, tapered sleeves 36, 37 corresponding to the sleeves 14, 15 in FIG. 1 are provided. These sleeves are connected to a surrounding drum 38 by balls and grooves 39, 40, 41 and 42, 43 and 44 respectively, corresponding to the balls and the grooves 19, 21, 23 and 20, 22, 24 respectively in FIG. 1. The drum 38 is rotatably mounted on the shaft 28 in the bearings 45, 46. In a way corresponding to what is described in connection to FIG. 1, a reciprocating motion of the body 32 is achieved by alternatingly energizing the magnetic solenoids 30, 31. The body 32 gives via the sleeves 36, 37 and the connections 39, 40, 41, 42, 43, 44 a turning motion of the drum 38 either successively in one direction or an alternating motion.

Also, other embodiments of the invention than those described above are, of course, possible within the scope of the claims. For example, the axial motion of the device 10 and the body 32 respectively can be achieved in another way than by magnetism, for example, by means of hydraulic or mechanical means. Further, instead of balls 11, 21, 22, 33, 39, 42 and grooves 12, 19, 20, 34, 41, 44 other guiding means can be used, for example, radially directed pins or wheels, projecting into the grooves 13, 23, 24, 35, 40, 43. The pins or wheels are fixed on the cover 6, and the sleeves 14, 15 respectively. Instead of a conical connection between the sleeves and the axially movable device it is possible to use other torque-transmitting releasable couplings.

I claim:

1. A device for transforming a reciprocating linear movement into a rotary movement comprising a first member adapted for reciprocating axial movement relative to a turnable second member, means for displacing said reciprocating first member in opposite linear directions, at least a pair of annular sleeves disposed in a space between said first and second members, each sleeve having a frustoconical tapered surface confronting and adapted for torque transmitting engagement with a corresponding tapered surface on one of said members, the surface of each sleeve opposite the frustoconical surface confronting a surface of the other one of said members and guide means including at least one helical groove in one of said confronting surfaces and a guide element engageable in said grooves, actuation of said one member linearly in one axial direction causing engagement with the frustoconical surface of one sleeve to prevent turning relative to said one member and through said guide means rotation of said other member, actuation of said one member linearly in an opposite axial direction causing engagement with the frustoconical surface of said other sleeve and through said guide means rotation of said other member.

2. Device according to claim 1, characterized by that the turnable member comprises a central shaft (1), which is surrounded by the axially displaceable member (10).

3. Device according to claim 1, characterized by that the turnable member comprises a drum (38) surrounding the axially displaceable member (32).

4. Device according to claim 1, characterized by that said guide means consist of balls, which are rotatably arranged in grooves in the sleeve and in the turnable or the axially displaceable member.

5. A device according to claim 1, characterized by that said first member member is prevented from being freely rotatable by a number of blocking bodies (11,33), which are provided in preferably axial grooves in the surface of the member and are fixed against rotation to a stationary portion of the device.

6. Device according to claim 1, characterized by that the said first member and the tapered sleeves are made of a ferro-magnetic material, and that it comprises two fixed magnetic solenoids (8, 9, 30, 31) arranged at an axial distance from each other, the solenoids being situated at each end of the axially displaceable member and being alternatingly energizable.

7. A device according to claim 6, characterized by that the solenoids are inserted into a cover (6), which is divided in a plane between the solenoids preferably perpendicularly to the solenoid axes by a portion (27) of a material with a low magnetic permeability.

8. A device according to claim 1, characterized by elastic elements (25, 26) arranged on each side of said first member, which elements influence said member at the respective end positions of the displacement of said member.

9. A device according to claim 8, characterized by that the elastic elements consist of disk springs (25) of a ferro-magnetic material.

10. A device according to claim 8, characterized by that the elastic elements consist of rings (26) of a highly elastic, compressible material, for example, foam rubber or foam plastics.

11. A device according to claim 10, characterized by that particles of a ferro-magnetic material are mixed into the material of the elastic elements (26).

* * * * *